Figure 1:
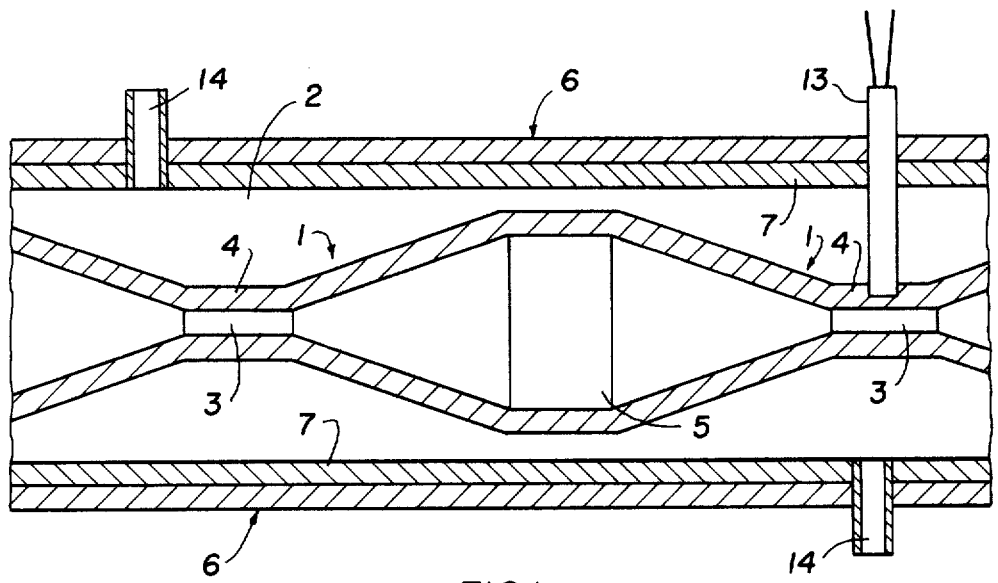

United States Patent [19]
Lorenian et al.

[11] 3,874,643
[45] Apr. 1, 1975

[54] METHOD AND APPARATUS FOR PLASTICIZING AND MIXING MATERIALS UNDER HIGH PRESSURE

[76] Inventors: Zareh Lorenian, Friedrichsplatz 16; Eugenia Lorenian, both of Mannheim, Germany

[22] Filed: May 18, 1973

[21] Appl. No.: 361,428

[30] Foreign Application Priority Data
May 18, 1972 Germany............................ 2224235
Aug. 7, 1972 Germany............................ 2238853

[52] U.S. Cl..................................... 259/185, 259/4
[51] Int. Cl.............................. B29b 1/06, B29b 3/00
[58] Field of Search......... 259/185, 193, 4, 18, 150, 259/180, 191, 192, 36; 425/206, 207, 208, 209

[56] References Cited
UNITED STATES PATENTS
480,149  8/1892  Thoens............................ 425/207
832,400  10/1906  Lyons.............................. 259/180
3,178,769  4/1965  Lorenian........................... 427/207

*Primary Examiner*—Robert W. Jenkins
*Attorney, Agent, or Firm*—Herbert L. Lerner

[57] ABSTRACT

Method of conveying positively uniformly and free of pulsation pulverulent or granular thermoplastic or thermosetting material while simultaneously plasticizing, mixing and homogenizing the material, which comprises initially feeding the material to a rotary conveying device, and simultaneously conveying the material through a selectively coolable and heatable tube having at least one passageway therein of alternately wider and narrower sections for the mixed material; and apparatus for carrying out the method.

7 Claims, 3 Drawing Figures

PATENTED APR 1 1975

3,874,643

SHEET 1 OF 2

METHOD AND APPARATUS FOR PLASTICIZING AND MIXING MATERIALS UNDER HIGH PRESSURE

The invention relates to method and apparatus for plasticizing and mixing materials under high pressures.

It has been known heretofore that conveyor elements, for example those having rotary blades, convey materials, and especially powdery or granular plastic materials only irregularly or in intermittent pulses. In the continuous manufacture of articles of both the semi-manufactured and finished type, such as shaped or profile members, tubes, films and the like, for example, this discontinuous, i.e. with intermittent pulsation, conveyance has a very disadvantage effect on the end products.

With respect to such conveyor devices, reference can be had to the most pertinent representative of the state of the art, namely U.S. Pat. No. 3,178,769 of Dr. Z. Lorenian, one of the applicants of the instant application.

It is accordingly an object of the invention of the instant application to provide a method and apparatus for conveying, plasticizing, mixing and homogenizing materials under high pressure which overcome the above-described disadvantages and shortcomings of these heretofore known apparatuses or machines, and simultaneously double, treble or quadruple the output of these apparatuses and methods of operating the same, while achieving this in a very economical manner and without considerable financial expenditure.

A further object of the invention is to provide such a method and apparatus wherein the plastic materials, which are conveyed with this method and apparatus of the invention, are satisfactorily and economically plasticized and intimately mixed or homogenized.

With the foregoing and other objects in view, there is provided in accordance with the invention, a method of conveying positively, uniformly and free of pulsation pulverulent or granular thermoplastic or thermosetting material while simultaneously plasticizing, mixing and homogenizing the material, which comprises initially feeding the material to a rotary conveying device, and simultaneously conveying the mixed material through a selectively coolable and heatable tube having at least one passageway therein of alternately wider and narrower sections where the mixed material is plasticized, mixed and homogenized.

Further in accordance with the invention, there is provided apparatus for conveying positively, uniformly and free of pulsations, pulverulent or granular thermoplastic or thermosetting material while simultaneously plasticizing, mixing and homogenizing the material, comprising a material inlet end and outlet end, at least two rotor members located adjacent one another at said inlet end, said rotor members having material conveyor elements at the periphery thereof, the conveyor elements of the one rotor member being offset with respect to the conveyor elements of the other rotor member, and an extrusion device for plasticizing, mixing and homogenizing, connected at said outlet end, said extrusion device comprising a tube, means for varying the temperature of mixed material forced through said tube by the conveyor elements of said rotor members, said tube having at least one passageway therein of alternately wider and narrower cross section for the mixed material, all of the parts of said extrusion device being stationary.

The invention of the instant application is also based on the recognition that, if the apparent density or bulk weight of the plastic material is lower that the apparent density of water, for example the apparent density of 1 liter of granular and pulverulent plastic material is only 700 g and only about 500 g respectively the inner diameter of the conveyor passage which adjoins the rotor and which represents an extension of the compression passage of the rotor, must be throttled or restricted to ensure uniform, continuous and pulse-free conveyance of the material therethrough. In accordance with a preferred embodiment of the apparatus of the invention the inner opening of the compression passage is at first equal to the inner opening of the passage or the rotors, and then reduces in accordance with the particular apparent density of the respective material.

In the case of a material whose apparent density is 700 g/liter, for example, the inner opening or cross-sectional area of the conveyor passage is throttled or restricted by 30 percent according to another feature of the invention. With a material having apparent density of 500 g/liter, the inner opening or cross-sectional area of the conveyor passage is throttled or restricted by a 50 percent according to a further feature of the invention.

This construction of the throttled or restricted cross-section can also be used in apparatuses for continuously, uniformly and positively conveying and simultaneously plasticizing and mixing materials that have only one rotor per se.

Other features which are considered as characteristic for the invention are set forth in the appended claims.

Although the invention is illustrated and described herein as embodied in method and apparatus for plasticizing and mixing materials under high pressure, it is nevertheless not intended to be limited to the details shown, since various modifications and structural changes may be made therein without departing from the spirit of the invention and within the scope and range of equivalents of the claims.

Figure 2:
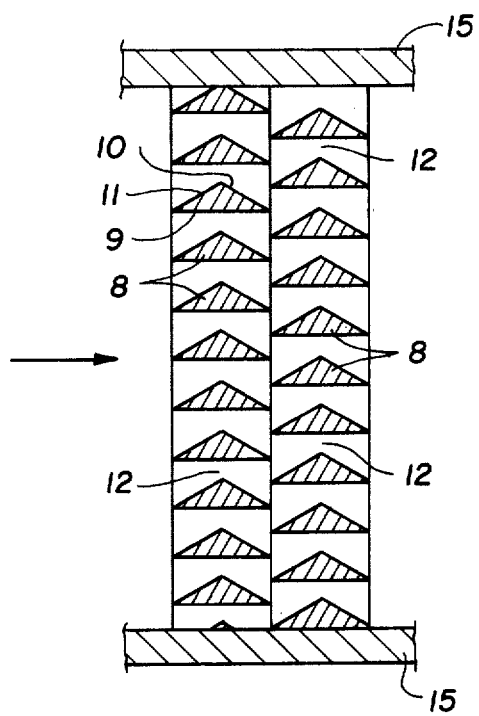
Figure 3:
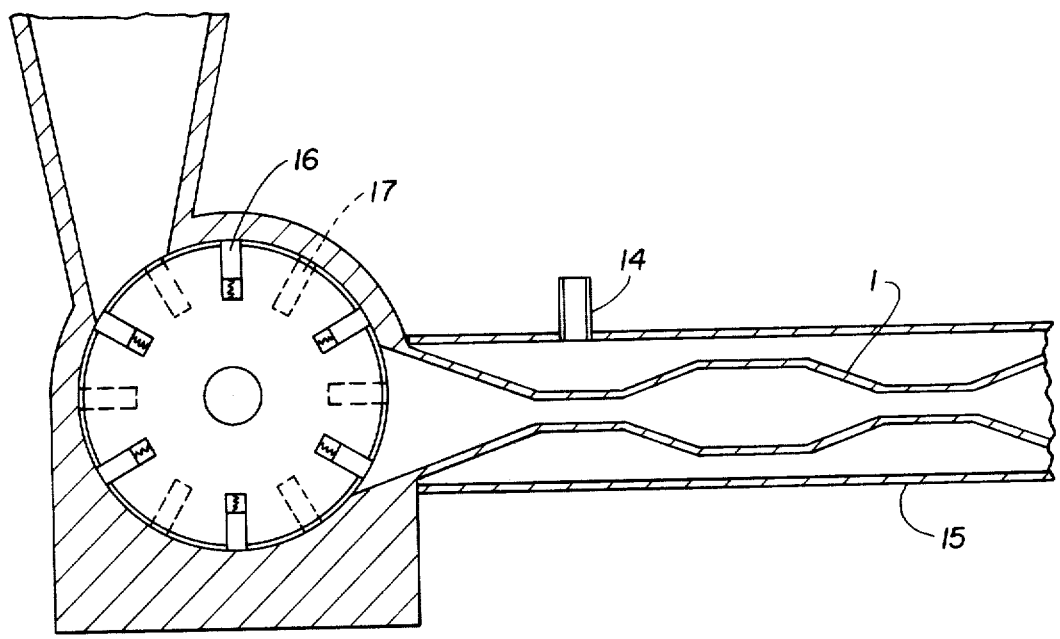

The construction and method of operation of the invention, however, together with additional objects and advantages thereof will be best understood from the following description of specific embodiments when read in connection with the accompanying drawings, in which:

FIGS. 1 and 2 are fragmentary longitudinal sectional views of a section of a tube forming part of two different embodiments of the invention; and FIG. 3 is a diagrammatic longitudinal sectional view of a complete embodiment including the variation of FIG. 1.

Referring now to the drawing and first, particularly, to FIG. 1 thereof, there is shown therein a tube 1 which is provided with heating and/or cooling device 6 such as the surrounding tube 7, into which a liquid medium 2 like oil, as heating and/or cooling agent, respectively is introduced. At spaced locations 4, the tube 1 is narrowed along a length of a few centimeters to an inner diameter 3 of about 5 mm, i.e. the opening is narrowed to about 5 mm and also, over a length of a few centimeters, the tube 1 is widened along a length of a few centimeters to a considerably greater inner diameter to provide a wider opening shown at 5. The exact inner diameters of the narrow and widened sections of the tube 1 may vary with the type of material that is to be mixed and plasticized. This alternating narrowing and widening of the tube, can be accompanied by providing between the alternating narrow and wide sections thereof, tube sections having apex angles of 60°, 90°, 120° or other angles. The thus shaped sections of the tube 1 can be repeated as desired along the length of the tube.

Thus narrowing and widening tube 1 induces alternating or intermittent horizontal and vertical compression of the material which is conveyed under uniform and positive pressure through the respective narrow 3 and wide sections of the tube 5 and causes the material being conveyed to be plasticized and intimately mixed or homogenized under the effect of the heat provided by the heating member 6 or the heating oil, for example.

The tube 7 of the heating-cooling device 6 is of uniform diameter and is provided with valve inlet and outlet tubes 14 for the heating-cooling medium 2 such as oil. A temperature-sensing device 13 of conventional construction extends through the tube 7 and is embedded in the wall of the tube 1.

In the embodiment of FIG. 2 there are provided at least two rows of flat triangular members 8 which are, for example, 5 to 6 mm in height and which are arranged offset from and behind one another and are disposed in a conveyor duct that is of relatively flat construction. The arrow in FIG. 2 denotes the direction of flow of the material through the duct. The conveyor duct of FIG. 2 has relatively narrow defining walls 15.

As can be seen in FIG. 2, one side 9 of the triangular members 8 is obviously always shorter than the sum of the other two sides 10 and 11, thereof. Accordingly, the plasticized material, which is conveyed through the spaces 12 between the triangles 8 under uniform and positive pressure, is mixed and homogenized through the intermediate spaces of the offset rows of the triangular members 8 and between their sides 9, on the one hand, and 10 and 11, on the other hand, of unequal length. The construction of the embodiment shown in FIG. 2 can be described as follows: An extruded member is provided in the form of a heatable and/or coolable flat tube in which obstructions of triangular configuration are arranged in rows offset relative to and behind one another in such a way that the material flowing through the tube is separated at the leading acute angle of each triangular member so that part of the material flows along the long side 9 of the triangles lying in the direction of flow of the material, while another part of the material flows along the two shorter sides 11 and 10 and around the obtuse angle included by those sides, the material thereby being subjected to a shearing action.

It is believed to be readily apparent to the man of ordinary skill in the art that the mixing and homogenizing elements of FIGS. 1 and 2 can be combined into one and the same plasticizing tube 1.

The rows of flat triangular members 8 can be disposed in any desired number in the relatively flat tube 15, one behind the other or staggered relative to each other with break therebetween.

In the complete embodiment of FIG. 3 there is additionally shown at the inlet end of the apparatus, two rotors 16 and 17 having material conveyor elements or blades 18 at the periphery thereof, the blades 18 of the one rotor 16 being offset with respect to the blades 18 of the other rotor 17. The rotors 16 and 17 suitably convey the material initially which is then discharged positively, uniformly and free of pulsations into the stationary pipe 1 at the outlet end of the apparatus, as shown in greater detail in FIG. 1.

We claim:

1. Method of conveying positively, uniformly and free of pulsations, pulverulent or granular thermoplastic or thermosetting material while simultaneously plasticizing, mixing and homogenizing the material, which comprises initially feeding the material to a rotary device, and simultaneously subjecting the material to alternating horizontal and vertical compressions of the material by conveying the material through a selectively coolable and heatable tube having at least one passageway therein of alternately narrow and wide sections to effect plasticizing, mixing and homogenizing the material.

2. Apparatus for conveying positively, uniformly and free of pulsations pulverulent or granular thermoplastic or thermosetting material while simultaneously plasticizing, mixing and homogenizing the material comprising a material inlet end and outlet end, at least two rotor members located adjacent one another at said inlet end, said rotor members having material conveyor elements said material conveyor elements of said rotors being offset one to another for conveying the material continuously free of pulsation, an extrusion channel at said outlet end, means for varying the temperature of mixed material forced through said channel by the conveyor elements of said rotor members, said channel having a plurality of alternately narrower and wider sections to subject the material to alternating horizintal and vertical compressions to effect plasticizing, mixing and homogenizing the material, all of the parts of said channel being stationary.

3. Apparatus for conveying positively, uniformly and free of pulsations pulverulent or granular thermoplastic or thermosetting material while simultaneously plasticizing, mixing and homogenizing the material according to claim 2 wherein there is a compression channel for said rotor members, and a conveyor channel located at said outlet end and connected to said compression channel, said conveyor channel having means for throttling the flow of the material therethrough.

4. Apparatus according to claim 3 wherein said throttling means comprises at least one section of reduced diameter in said conveyor channel, the inner diameter of said reduced section being substantially 30 to 50 percent of the original section of said conveyor channel.

5. Apparatus according to claim 3 wherein said conveyor channel comprises a rigid tube having, at spaced intervals along the length thereof, alternate constricted and widened sections, and including means for varying the temperature of said rigid tube.

6. Apparatus according to claim 2 wherein said tube is rigid, and said alternately wider and narrower cross sections of said passageway being formed by respective widened and constricted sections of said tube located at spaced intervals along the length of the tube.

7. Apparatus according to claim 2 wherein said channel has a flat tube and has a multiplicity or passageways of alternately wider and narrower cross section, said passageways being defined by a multiplicity of obstructions of substantially triangular configuration arranged in said tube in rows offset relative to and behind one another in such a way that the material flowing through said tube is separated at a leading acute angle of each of said substantially triangular members, so that part of the material flows along a long side of the respective triangles that is disposed in direction of flow of the material, another part of the material flowing along two shorter sides of the triangle and around an obtuse angle included by said two shorter sides, the material thereby being subjected to a shearing action.

* * * * *